Nov. 2, 1937.  D. F. SPROUL  2,097,524
SPRING UNIT
Filed Dec. 29, 1933
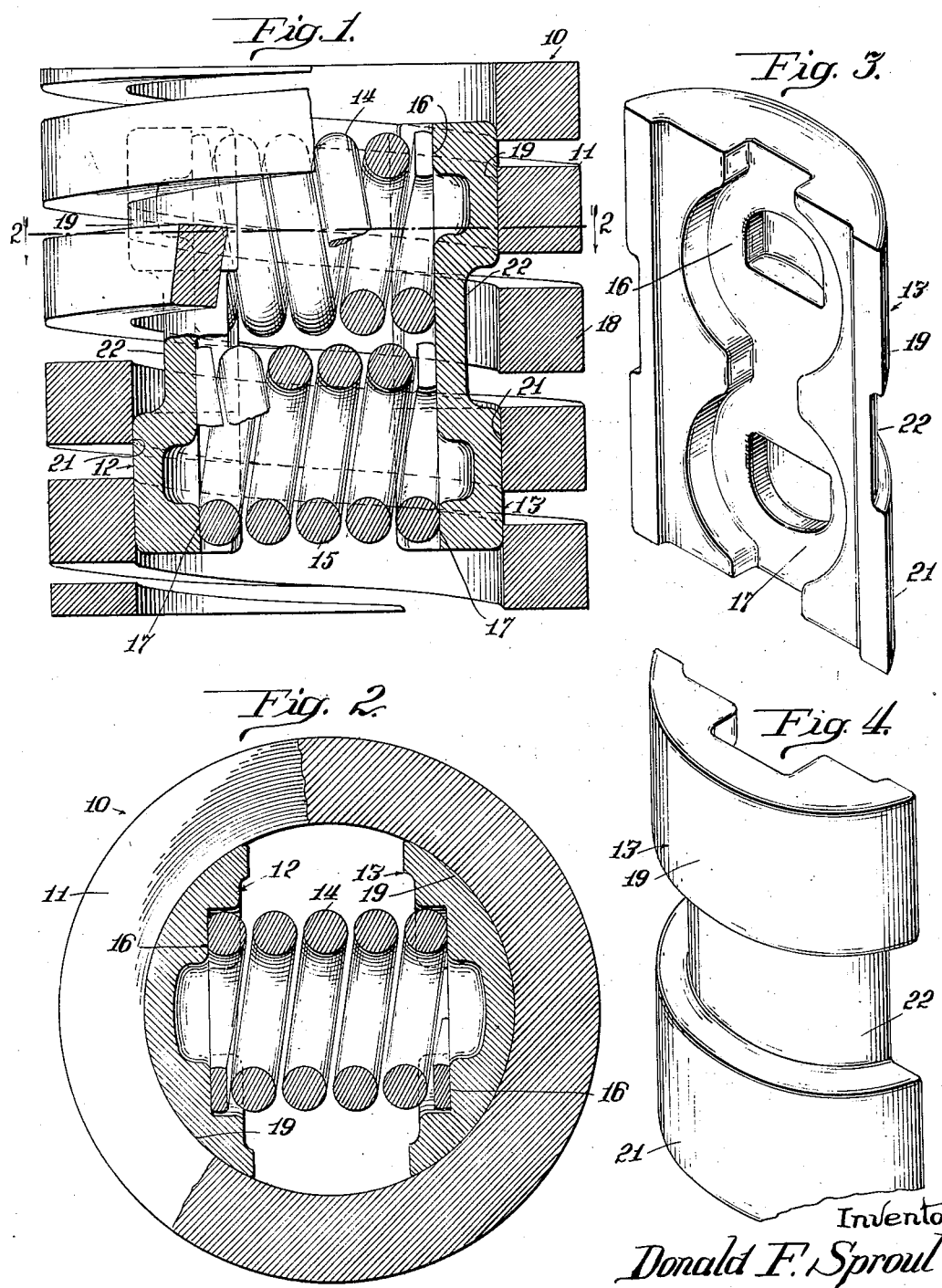
Inventor
Donald F. Sproul
By Gillson, Mann & Cox
Attorneys Patented Nov. 2, 1937

2,097,524

UNITED STATES PATENT OFFICE 2,097,524

SPRING UNIT

Donald F. Sproul, Chicago, Ill., assignor to Cardwell-Westinghouse Company, a corporation of Delaware Application December 29, 1933, Serial No. 704,427

9 Claims. (Cl. 267—9)

This invention relates to a combined spring and shock absorber, and, more particularly to bolster springs for railway cars and the like.

One of the objects of the invention is the provision of a new and improved spring unit having friction shock absorbing mechanism associated therewith with means for compensating for wear on the friction elements.

A further object of the invention is the provision of a new and improved shock absorbing unit having means for causing a substantially uniform resistance to the compression and extension of the unit.

Another object of the invention is the provision of a unit having means for frictionally resisting the compression of the spring and for also frictionally resisting its rebound, whereby shocks are absorbed with a minimum vibration of the spring.

A still further object of the invention is the provision of a new and improved combined spring and shock absorbing unit that is simple in construction, inexpensive to manufacture and assemble, efficient in operation, which will not be materially affected by the wear of the parts and that may be substituted for the spring units now in use on railway cars.

Other and further objects and advantages of the invention will appear from the following description, taken in connection with the accompanying drawing, in which—

Fig. 1 is an elevation of the bolster spring showing parts in section and parts broken away;

Fig. 2 is a section on the line 2—2 of Fig. 1;

Fig. 3 is a perspective view of one of the friction shoes showing the inside thereof; and Fig. 4 is a perspective view of one of the friction shoes showing the outer side thereof.

In the use of springs on railway cars and the like, it is desirable that means be provided for preventing the over compression of the springs and for cushioning the vertical movement of the car. In the use of car bolster springs, it has been proposed to substitute a shock absorbing unit for one or more of the spiral bolster springs that are usually employed at each side of the truck. These units are usually provided with a system of friction wedges and shoes for resisting the compression of the springs, the parts being so arranged that the resistance increases as the spring is compressed. These devices are objectionable in that no means are provided for resisting rebound. The present invention seeks to remedy this difficulty by the provision of a system of friction spring pressed elements that frictionally resist both the compression and the expansion of the supporting springs.

Referring now to the drawing, in which one embodiment of the invention is disclosed for illustrative purposes, the reference character 10 designates a spring unit which may be of the same overall length and diameter as the conventional bolster supporting spiral springs now in common use. This unit comprises a stiff helical supporting spring 11 the turns of which may be of any suitable shape in cross section. The inner surface of this spring construction constitutes a friction surface. Preferably, though not necessarily, the turns of the spring are rectangular in cross section, thereby providing a smooth interior of extended surface which is frictionally engaged by a plurality of friction shoes 12 and 13. These shoes are of shorter length than the springs but are of such length as to limit the compression of the spring and to receive the overload under abnormal conditions.

Suitable means are provided for forcing these shoes into frictional contact with the interior surface of said springs. In the form of construction selected to illustrate one embodiment of the invention, two shoes are employed, being arranged opposite each other and forced apart by expansible means inserted between the two shoes. As shown, this expansible means is in the form of a pair of springs 14 and 15, arranged one above the other. Each of the shoes is provided with a spring seat 16 at its upper end and a spring seat 17 at its lower end.

The outer surfaces of the shoes are curved to conform to the curvature of the interior of the spring 11, as shown more clearly in Fig. 2 of the drawing.

When the spring 11 is compressed, the upper and lower turns thereof may be considered as moving toward the central coil 18. As a result, the wear on the shoes will take place principally at the ends and consequently if the entire outer surface of the shoes be continuous, the wear on the upper and lower frictional surfaces 19 and 21 of the shoes will in time be such that the pressure of the springs 14 and 15 will be exerted principally on the central turn 18 with a consequent lowering of the frictional resistance to the compression and expansion of the spring 11. In order to eliminate this disadvantage, the shoes are provided with a friction surface at each end and none in the central part of the shoe. The outer surface of each shoe is discontinuous or interrupted at its central portion by a channel 19, forming a frictional surface 21 at one end and the frictional surface 22 at the other. The channel 19 is sufficiently wide to accommodate one or more of the central turns of the coil 11 depending on the number of turns in the coil. As shown, the frictional surfaces 21 and 22 each engage the two end turns whereby wear will not affect the efficiency of the friction elements.

The springs 14 and 15 are of such length that they are normally under compression.

Under certain conditions as irregularity of road bed or rails, or when cars having "flat" wheels operate at such speed that the vibration caused by these defects as when the vibration due to flat wheels synchronizes with the natural period of vibration of the car structure, there may be built up a terriffic vibration or oscillation which is augmented by the rebound of springs, or the rebound of freely moving shock absorbing devices. In practice, the spring unit described above resists the downward movement of the car without rebounding to give impetus to the upward component of the vibration of the car. As a result, under all circumstances, even the most unfavorable, the unit functions to prevent abnormal vertical oscillation or vibration of the car. This is considered an important feature of the invention.

One or more of the springs in the conventional bolster spring cluster may be replaced by this spring unit. In practice, one spring on each side of the truck is replaced by one of these spring units. Preferably the outer front spring on one side and the outer rear spring on the other are replaced so that the bolster will remain unbalanced.

In the operation of the device, the end portions of the spring 11 not engaged by the friction shoes will be free to yield for cushioning the initial downward movement of the car. For extremely light shocks, there may be little or no compression of the remaining portion of the spring, but for heavier shocks the coils of the spring engaging the frictional surfaces 19 and 21 will move relative to said surfaces and the frictional resistance to such movement will tend to prevent vertical vibration or oscillation of the car. The frictional resistance of the shoes resist the rebound of the spring and, as a result of this resistance in both directions the shocks incident to the operation of the car are absorbed or dissipated without the objectionable rebound of these shock absorbing units.

I claim as my invention:

1. In a spring shock absorbing unit, a load supporting spiral spring, each turn having interior friction surfaces, friction shoes engaging said surfaces, the intermediate portions of said shoes being spaced from the interior surface of said spring and resilient means extending between said shoes and exerting a constant outward pressure thereon, said shoes engaging the intermediate portions only of said spiral spring at a plurality of points spaced apart.

2. In a combined spring and shock absorbing unit, a load-supporting spiral spring the turns of which are rectangular in cross section, friction shoes engaging the inner faces of the turns of said spring, the intermediate portions of said shoes being recessed whereby the end portions only of said shoes engage the inner faces of the turns of said spring and resilient means extending transversely to the axis of said spiral spring and engaging the end portions only of said shoes for forcing the same into frictional contact with the turns of said spring for resisting the relative movements of said turns.

3. In combination, a load supporting helical spring, rigid means within said spring extending longitudinally thereof and being of a length less than the length of said spring, friction surfaces on the end portions of said means only for frictionally engaging the interior surfaces of the turns of said spring, the intermediate portion of said means being spaced from the interior of said spring and means consisting of springs having parallel axes for forcing said friction surfaces into contact with the interior of said spring.

4. In a spring unit, a load supporting coiled spring, certain of the turns of said spring being rectangular in cross section forming friction surfaces on their interior, a pair of friction shoes within said spring, said shoes being of a length less than the length of said spring and adapted to form a column for supporting overload on said spring, the intermediate portions of each shoe being spaced from said spring, spring seats in the ends of said shoes and compression springs on said seats for forcing said shoes outwardly along the axes of said compression springs into frictional contact with said friction surfaces for resisting the compression and expansion of said spring.

5. A friction shoe for frictionally engaging the inner surface of a helical spring comprising a rigid member curved transversely on its outer surface at each end thereof to form a friction surface, said member having its intermediate portion cut away on its outer surface between said friction surfaces and a spring seat on the inner surface of said member at each end thereof opposite each friction surface.

6. In combination, an extensible and contractible friction member circular in cross section, a plurality of shoes, each having a friction surface at each end engaging said member and having an intermediate portion spaced from said member and means for forcing said shoes into frictional engagement with said members, said shoes being shorter than said member and said means consisting of coiled springs having their axes parallel.

7. In a spring shock absorbing unit, a load supporting spiral spring element, a pair of friction shoes having parti-cylindrical outer surfaces engaging the interior surface of said spring element, a plurality of spring seats alined along the center of the inner surface of each shoe, and a spring engaged in each opposite pair of seats for forcing the shoes into frictional contact with the interior of said spiral spring element.

8. In combination, a load supporting helical spring having friction surfaces on its inner periphery, a pair of friction shoes having outer parti-cylindrical surfaces engaging said friction surfaces and of substantially the same curvature, a spring seat formed on the inner surface of each shoe opposite the median zone of the parti-cylindrical outer surface thereof, and a spring having its ends engaged with the oppositely disposed facing seats of the shoes for forcing said shoes apart and into engagement with the friction surfaces of the helical spring.

9. In a shock absorbing unit, a spiral spring member, a plurality of friction shoes of less length than said member and normally engaging the central portion only of the interior surface thereof, and means including spring means between said shoes for forcing said shoes laterally outwardly into frictional engagement with the interior of said member at a constant pressure for yieldingly resisting the compression and extension of said spring member.

DONALD F. SPROUL.